Feb. 22, 1927.

L. L. COHEN ET AL 1,618,171

UNIT POWER TRUCK

Original Filed Feb. 1, 1923    2 Sheets-Sheet 1

Feb. 22, 1927.

L. L. COHEN ET AL 1,618,171

UNIT POWER TRUCK

Original Filed Feb.1, 1923    2 Sheets-Sheet 2

Inventors
L.L.Cohen & F.F.Small
William Bradbury
McCaleb & Pierce Attys

Patented Feb. 22, 1927.

1,618,171

UNITED STATES PATENT OFFICE.

LOUIS LEWIS COHEN, OF CHICAGO, ILLINOIS, AND FRED FULTON SMALL, OF SOUTH PASADENA, CALIFORNIA.

UNIT POWER TRUCK.

Application filed February 1, 1923, Serial No. 616,398. Renewed December 23, 1926.

Our invention relates to unit power trucks for railway cars.

As its name implies, the truck of our invention is a complete power unit which, as such, may be applied to or detached from a car body. It is contemplated that either one or a plurality of the unit power trucks of our invention may be employed in connection with a single car or in connection with the several cars of a train. When a plurality of our power units are employed in connection either with a single car, or in a train, the several power plants, as well as the clutches and transmissions whereby the same are connected with their respective sets of driving wheels, are intended to be controlled from a single point on the car or train through the agency of electric, pneumatic or electro-pneumatic remote control devices or systems of any of the several suitable types well known to railway engineers.

One of the objects of the invention is to provide a unit power truck which is of minimum overall length and height, this result being made possible by mounting the power plant well down between one pair of the truck wheels, and by providing a novel arrangement of parts which enables us to dispense with the shaft which connects such wheels in conventional truck constructions.

Another object of the invention is to provide a novel arrangement and construction of parts whereby the car body and the power plant of the truck unit are independently spring supported upon the truck wheels, this construction very largely preventing the vibrations incident to the operation of the power plant from being transmitted to the car body, thus improving the riding qualities of the car, and prolonging the life of the power plant by rendering it practically immune from heavy shocks incident to up and down movements of the car body relative to the truck wheels.

Other objects and advantages of our improved car truck are more fully set forth in the following detailed description wherein reference is made to the accompanying drawings, in which—

Similar characters of reference refer to similar parts throughout the several views.

Figure 1:
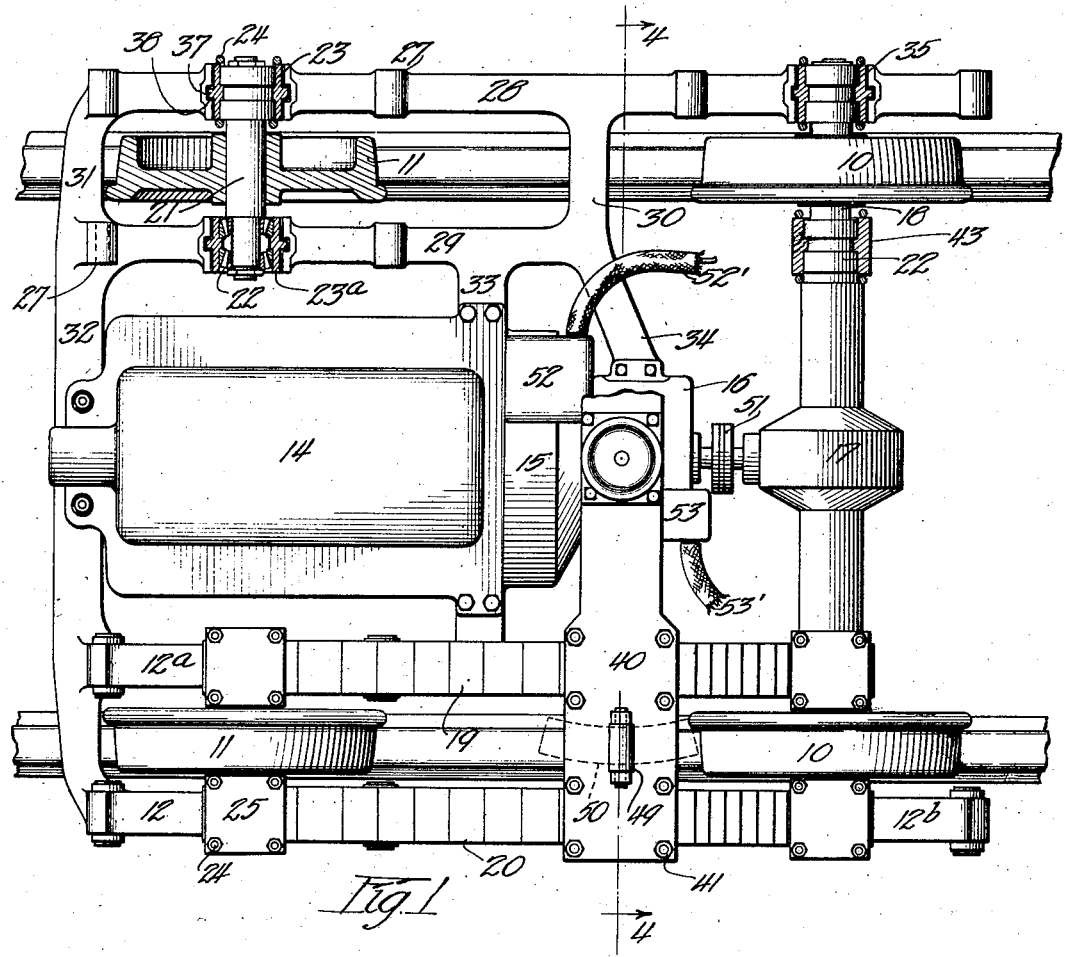
Figure 1 is a plan view of a unit power truck embodying our invention, certain parts being broken away on one side of the truck along the axes of the wheels.
Figure 2:
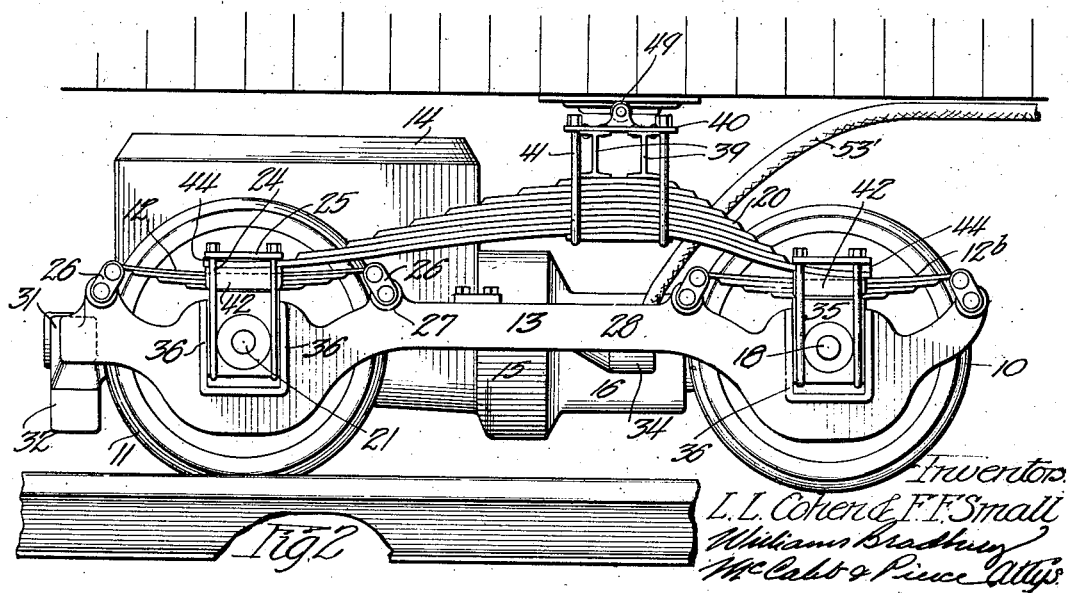
Figure 2 is a side elevation of the truck.
Figure 3:
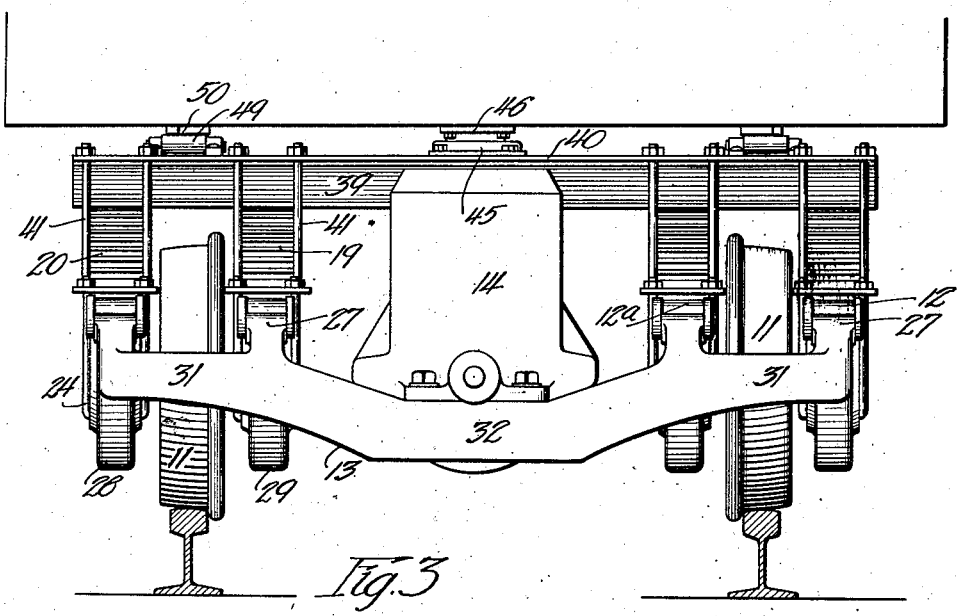
Figure 3 is an elevation of the left end of the truck.
Figure 4:
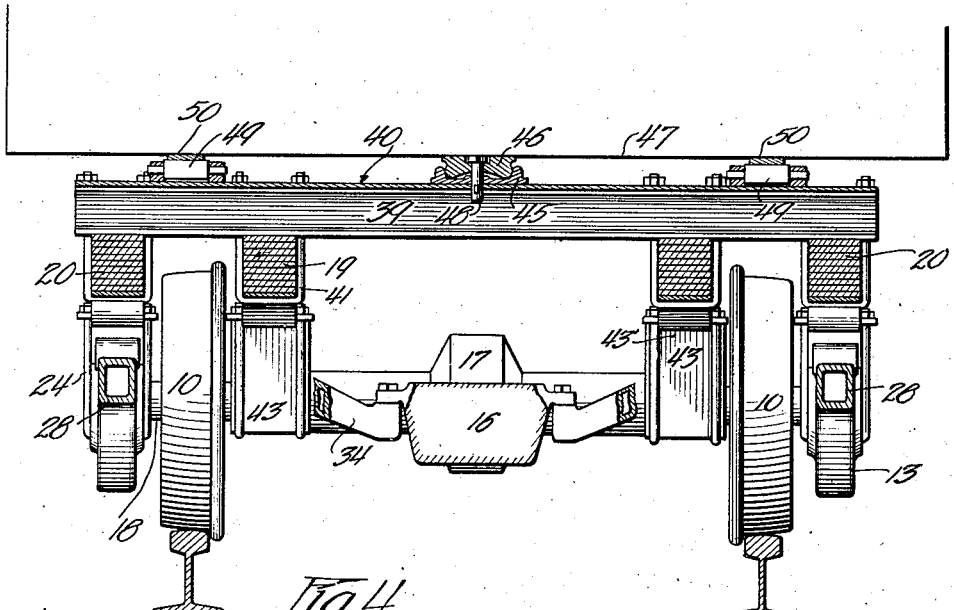
Figure 4 is a transverse section of the truck taken on the line 4—4 of Figure 1.

The unit power truck of our invention comprises, in general, a pair of power wheels 10 secured upon a continuous shaft, and a pair of trailer wheels 11 secured upon stub shafts, the several shafts being journaled in bearing blocks from which is suspended, by means of short semi-elliptic springs 12, 12$^a$ and 12$^b$, a frame 13 which carries the power plant. The power plant, which is somewhat diagrammatically shown, comprises an internal combustion engine 14, a clutch 15, a transmission 16, and a bevel gear drive 17 to the live axle 18 which carries the power wheels 10. The bolster, upon which is pivoted the end of the car body, is supported at each side of the truck by a pair of semi-elliptic springs 19 and 20, the outer ends of the springs being secured to the bearing blocks but independently of the engine frame springs.

Each of the two trailer wheels 11 of the truck, which are those wheels which lie adjacent the middle of the car, is pressed upon or otherwise secured to a stub shaft 21, and each end of the shafts is provided with suitable anti-friction bearings, such as the taper roller bearings indicated at 22, mounted in a bearing block 23 at the outer end of the shaft and in a bearing block 23$^a$ at the inner end. The short engine frame springs 12 and 12$^a$ are clamped at their centers to the upper surface of the bearing blocks 23 and 23$^a$ respectively by means of U bolts 24, the legs of which pass upwardly through clamping plates 25. The free ends of the springs 12 and 12$^a$ are connected through pairs of links 26 to suitable bosses 27 formed upon the upper edges of the engine frame 13.

The frame 13 (here indicated as being an integral casting, but which, if preferred, may be built up in any suitable manner) consists of a relatively long outside rail 28 at each side of the truck and outside of the wheels, and a relatively shorter inside rail 29 lying on the inner sides of the wheels 11 but not extending to the driving wheels 10. At each side of the truck, the rails 28 and 29 of the frame are connected between the wheel 10 and the wheel 11 by a tie 30, while at the left end of the truck, they are connected by a tie 31 which continues into the bridge portion 32 connecting the two sides of the frame and providing at its center a support for one end of the engine 14. Arms 33 and 34 extend inwardly from each of the rails 29 to form suitable supports for the opposite end of the engine 14 and for the transmission housing 16, respectively.

The frame 13 is similarly suspended at its right end from the power wheels 10 except that but two frame springs are employed at the right end of the truck, whereas four are employed at the left end of the truck. This is because the center of gravity of the power unit is considerably nearer the axis of the wheels 11 than the axis of the power wheels 10, and consequently more weight must be borne by the wheels 11. As previously stated, the outer rails 28 of the frame are the only rails which extend to the power wheels 10, and the right ends of these rails are suspended from the outer bearing blocks 35 by means of the springs $12^b$.

As an additional means for keeping the wheels in alignment, the rails 28 and 29 of the engine frame are provided, where they pass beneath bearing blocks, with pairs of jaws 36—36, which permit vertical reciprocation of the jaws relatively to the bearing blocks, with the effect that in addition to aligning the wheels, rotation of the bearing blocks is prevented. Transverse movement of the bearing blocks within the jaws 36 is prevented by the ribs 37 on the sides of the bearing blocks which co-operate with vertical grooves 38 in the inner faces of the jaws 36.

The bolster comprises a pair of spaced I beams 39 extending from one side of the truck to the other, the I beams being held in spaced relation by the plate 40 extending along their upper surfaces. As previously stated, the bolster is carried at each side of the truck by inner and outer leaf springs 19 and 20 respectively. The mid portions of the bolster springs are secured to the bolster by U bolts 41, the legs of which pass upwardly through the plate 40. The ends of the outer springs 20 are clamped by the U bolts 24, and the plates 25 to the bearing blocks, the extremities of the main leaf resting upon a channel-shaped member 42. The web of the latter lies over the mid portion of the spring 12 ($12^b$), and the legs thereof extend downwardly to occupy the space represented by the difference in the width of the frame spring 12 ($12^b$) and the bolster spring 20.

It will be noted that the bearing blocks 43 to which the right ends of the inner bolster springs 19 are clamped must differ slightly in construction from the other six bearing blocks of the truck because of the fact that the bearing blocks 43 do not support any frame springs such as $12^b$. Hence, the bearing blocks 43 are built up higher than the others in order that the ends of the bolster springs 19 may be supported at the same height as the other ends of the bolster springs, this built-up portion being indicated at $43'$. The left ends of the springs 19 are secured to the bearing blocks $23^a$ similarly to the ends of the outer bolster springs 20. Wedge-shaped shims 44 may be provided, if desired, to co-operate with the inclined upper surfaces of the channel-shaped members 42 in order that the ends of the bolster springs may be so clamped as to preserve the curve of their main leaves.

The pivotal connection of the bolster to the car body may be of any well known construction, such as by the dished annular bearing plate 45, here shown clamped to the plate 40 of the bolster at its center, and the co-operating annular member 46 secured to the car frame 47, the car frame being held down to the bolster by a pin 48. The pivotal supporting of the car frame upon the bolster is also preferably aided by a roller 49 at each end of the bolster, which co-operates with an arcuate rail 50 on the underside of the car frame.

As the driving wheels 10, which are located toward the end of the car should, in order to provide more perfect traction, carry a greater weight than the trailer wheels 11, we prefer to form the bolster springs 19 and 20 with long and short ends, the longer ends extending to the trailer wheels 11 and the shorter ends to the power wheels 10 whereby the center of gravity is shifted nearer the latter, resulting in an increased weight upon the power wheels.

While both the bolster springs and the frame springs are secured to the same bearing blocks, the bolster and the engine frame 13 are entirely independent of each other as regards vibration because the extremities of the bolster springs are rigidly clamped to the bearing blocks at the mid portions of the frame springs. Any flexing of the frame springs will impart no movement to the bolster springs, for the bolster springs are secured at the non-flexing portion of the frame springs. Conversely, flexing of the bolster springs will not affect the suspension of the frame through the frame springs, for the reason that the bolster springs are clamped to the bearing blocks, and any strains on the latter are imparted through the wheel shafts and wheels directly to the track rails.

It will be seen from the foregoing, that any vibrations, either due to the engine or to the transmission, which cause movement of the engine frame 13, will be absorbed through the frame suspending springs directly onto the bearing blocks and supporting wheels without imparting any considerable vibration through the bolster springs to the car body. Thus, the effect of pounding of the motor during the starting of the train, or chattering of the transmission gears, will be confined to the engine frame, and only extreme vibrations will be felt by passengers in the car.

Similarly, impact on the car body frames during coupling of the cars, and momentum of the car bodies in sudden starting and stopping of the train, are absorbed directly by the wheels without any considerable jar to the power unit which is independently suspended.

It is also readily seen that by the use of the construction we have shown, a unit power plant of considerable size may be carried in a truck of comparatively small over-all dimensions, and that the center line of the power plant may be set as low as desired without interference from the wheel supporting shafts. This allows a straight line drive from the power unit to the axis of the power shaft 18, and the universal joint in the propeller shaft need provide for only the slightest misalignment.

The axes of the trailer wheels 11, although carried upon stub shafts, are kept at all times substantially horizontal regardless of uneven distribution of weight on the engine frame or on the car body. This is because the stub shaft is supported equally at both ends by the frame springs, and also equally at both ends by the bolster springs 19 and 20. Thus, while each of the four wheels is capable of considerable movement independent of the other three wheels to allow of inequalities in the track level, the axis of each wheel remains horizontal. The power wheel supporting shaft 18 being a continuous and not a stub shaft need not be supported except at its extremities, but in order to provide, for the short ends of the inner bolster springs 19, a support similar to that on the bearing blocks 35 at the short ends of the outer springs 20, we have provided the beforementioned bearing blocks 43.

It will be understood, of course, that the alignment of the wheels is preserved by the jaws 36 which hold the several bearing blocks against any substantial movement longitudinally of the truck, and the wheels are spaced, more particularly the trailer wheels 11, by the ribs 37 of the bearing blocks which fit into the groove 38 of the jaws 36. We have found it preferable to provide a sufficiently loose fit of the bearing blocks in the jaws 36 to permit of a very slight movement of the blocks relative to the frame 13 in a direction parallel with the rails so that when the bolster springs 19 and 20 are compressed under great weight, the main leaves of the springs may slightly spread the bearing blocks in straightening out.

The unit power plant which we have here illustrated very generally as an internal combustion engine with an integral clutch and transmission driving the bevel gearing 17 and the power shaft 18 through a universal joint 51, may be of any suitable type or construction, or may be an electric motor, or other desired type of power generator. We prefer, however, when using an internal combustion engine power plant, as here shown, to control the starting by suitable pneumatic, electric, or electro-pneumatic apparatus indicated at 52, and the clutch and gear transmission by a similarly controlled apparatus indicated at 53, connection being had between the car body and the truck through any suitable flexible conduits such as shown at 52' and 53'.

The control is preferably so arranged that all the unit power trucks on the train are controlled from one central point in the motorman's cab, and so that by means of the control system just described all of the engines may be started at once and all of the clutches simultaneously thrown in, and gear changes likewise made simultaneously. Suitable air-brakes may be readily provided, but for the purpose of clarity, the brake mechanism has been omitted from the unit truck here shown.

While we have illustrated and described what we now believe to be a preferred embodiment of our invention, we do not limit ourselves to the specific construction and arrangement of parts herein shown and described.

What we claim as new and desire to secure by Letters Patent of the United States is:

1. In a power truck for railway cars, the combination of a frame, power means mounted on said frame, two pairs of wheels, shafts for said wheels, means operatively connecting said power means to one pair of said wheels, semi-elliptic springs connected at their intermediate portions to said shafts and at their ends to said frame for yieldingly supporting said frame on said shafts, a bolster, and semi-elliptic springs connected at their intermediate portions to said bolster and at their ends to said shafts.

2. In a power truck for railway cars, wheels, shafts on which said wheels are carried, an internal combustion engine, a frame on which said internal combustion engine is supported, springs supporting said frame from said shafts, a bolster adapted to support one end of a car body, and separate springs between the said shafts and said bolster.

3. In a power truck for railway cars, the combination of a frame, power means mounted on said frame, a front pair of wheels, a rear pair of wheels, shaft means for said wheels, means operatively connecting said power means with one pair of wheels, springs yieldingly supporting said frame on the front and rear shaft means, a bolster, and semi-elliptic springs having their intermediate portions connected to said bolster and their ends connected to the front shaft means and to the rear shaft means.

4. In a power truck for railway cars, wheels, shafts on which said wheels are carried, an internal combustion engine, a frame on which said internal combustion engine is supported, semi-elliptic springs having their ends joined to said frame, intermediate portions thereof being joined to said shafts, respectively, and secondary springs connected to said shafts for supporting the car body.

5. In a power truck for railway cars, wheels, shafts on which said wheels are carried, a power plant, a frame on which said power plant is supported, semi-elliptic springs having their ends joined to said frame, intermediate portions of said springs being joined to said shafts, respectively, a bolster adapted to support one end of a car body, and semi-elliptic springs, each having an intermediate portion thereof fixed to said bolster, the ends of said last-mentioned springs being supported on said shafts.

6. In a power truck for railway cars, shafts, wheels on said shafts, a power plant, a frame on which said power plant is supported, springs having their ends joined to said frame, intermediate portions of said springs being joined to said shafts, respectively, a bolster adapted to support one end of the car body, and springs each having an intermediate portion thereof fixed to said bolster, the ends of said last mentioned springs being supported on said shafts.

7. In a power truck for railway cars, wheels, shafts on which said wheels are carried, a bolster adapted to support one end of a car, an internal combustion engine power plant carried by said truck, and springs separately supporting said bolster and said power plant from said shafts.

8. In a power truck for railway cars, a pair of wheels, stub shafts carrying said wheels, a pair of driving wheels, a power plant positioned between the inner ends of said stub shafts with its axis aligned longitudinally of said truck, and transmission mechanism joining said power plant to said driving wheels.

9. In a power truck for railway cars, a pair of wheels, stub shafts supporting said wheels, a pair of driving wheels, a shaft on which said driving wheels are carried, a power plant positioned between the inner ends of said stub shafts, and transmission mechanism joining said power plant to the shaft of said driving wheels.

10. In a power truck for railway cars, a pair of wheels, stub shafts carried by said wheels, a pair of driving wheels, a drive shaft on which said driving wheels are carried, a power plant positioned between the inner ends of said stub shafts, transmission mechanism joining said power plant to said drive shaft, and springs supporting said power plant from said shafts.

11. In a power truck for railway cars, a pair of wheels, stub shafts for said wheels, a pair of driving wheels, a driving shaft on which said driving wheels are carried, a power plant positioned between the inner ends of said stub shafts, transmission mechanism joining said power plant to said driving shaft, spring supporting said power plant from said shafts, a bolster adapted to support one end of a car, and other springs supporting said bolster from said shafts.

12. In a power truck for railway cars, a pair of wheels, stub shafts carried by said wheels, a pair of driving wheels, a driving shaft on which said driving wheels are carried, a power plant positioned between the inner ends of said stub shafts, a frame on which said power plant is mounted, springs supporting said frame from said shafts, said frame and springs acting to maintain said shafts in substantially parallel relation, transmission mechanism joining said power plant to said driving shaft, a bolster adapted to support one end of a car, and other springs supporting said bolster from said shafts.

13. In a power truck for railway cars, the combination of a frame, power means mounted on said frame, a first pair of wheels, shaft means extending between said first pair of wheels, a second pair of wheels, stub shafts for each of said second pair of wheels, springs yieldably supporting said frame on the shaft means for the first pair of wheels, springs effective between the opposite ends of each stub shaft and said frame for yieldably supporting said frame on said second pair of wheels, a bolster, and spring means interposed between said bolster and said shaft means and the pair of stub shafts for said second pair of wheels.

14. In a power truck for railway cars, the combination of a frame, power means mounted thereon, a first pair of wheels, shaft means extending between said first pair of wheels, driving means operatively connecting said power means with said shaft means, a second pair of wheels adjacent the other end of the truck, stub shafts for each of said second pair of wheels, semi-elliptic springs having their intermediate portions connected to the shaft means for said first pair of wheels and having their ends connected to said frame, pairs of semi-elliptic springs on the opposite sides of each of said second pair of wheels having their intermediate portions connected to said stub shafts and their ends connected to said frame, a bolster, and two pairs of semi-elliptic springs connected at their intermediate portions to said bolster, said latter springs each being connected at one end to the shaft means for said first pair of wheels and being connected at the other end to the stub shafts on opposite sides of said second pair of wheels.

15. In a truck for railway cars, the combination of a frame, two pairs of wheels, shaft means for said wheels, semi-elliptic springs having their intermediate portions connected to said shaft means and their ends connected to said frame for each of said two pairs of wheels, a car-supporting member, and semi-elliptic springs having their intermediate portions connected to said car-supporting member and having their ends connected to the shaft means for the two pairs of wheels respectively.

In witness whereof, we have hereunto subscribed our names this 12th day of January, 1923.

L. LOUIS COHEN.
FRED FULTON SMALL.